US006327541B1

(12) United States Patent
Pitchford et al.

(10) Patent No.: US 6,327,541 B1
(45) Date of Patent: *Dec. 4, 2001

(54) ELECTRONIC ENERGY MANAGEMENT SYSTEM

(75) Inventors: Michael E. Pitchford, Elsah, IL (US); Thomas R. Voss, Crestwood, MO (US)

(73) Assignee: Ameren Corporation, St. Louis, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,024

(22) Filed: Jun. 30, 1998

(51) Int. Cl.[7] .................................................. G06F 17/00
(52) U.S. Cl. .......................... 702/62; 705/413; 705/412
(58) Field of Search ................... 705/412, 34, 400, 705/30.13, 413; 340/870.02, 870.03; 702/60, 61, 62; 324/127, 141, 142, 143; 700/295; 73/861.02, 861.03

(56) References Cited

U.S. PATENT DOCUMENTS

| 3,705,385 | * | 12/1972 | Batz ................................ 340/870.02 |
|---|---|---|---|
| 3,842,248 | * | 10/1974 | Yarnell et al. ........................ 705/34 |
| 4,415,896 | * | 11/1983 | Allgood ........................ 340/870.03 |
| 4,608,560 |   | 8/1986 | Allgood . |
| 4,757,456 |   | 7/1988 | Benghiat .............................. 705/412 |
| 4,799,156 |   | 1/1989 | Shavit et al. .......................... 705/26 |
| 5,283,572 | * | 2/1994 | McClelland et al. ........... 340/870.02 |
| 5,315,531 |   | 5/1994 | Oravetz . |
| 5,383,113 |   | 1/1995 | Kight et al. ............................ 705/40 |
| 5,465,206 |   | 11/1995 | Hilt et al. .............................. 705/40 |
| 5,483,455 | * | 1/1996 | Pickering .............................. 705/40 |
| 5,495,239 | * | 2/1996 | Ouellette ........................ 340/870.02 |
| 5,572,438 | * | 11/1996 | Ellers et al. .......................... 700/295 |
| 5,590,197 |   | 12/1996 | Chen et al. ............................ 705/65 |
| 5,649,117 |   | 7/1997 | Landry .................................. 705/40 |
| 5,654,886 |   | 8/1997 | Zereski, Jr. et al. .................... 702/3 |
| 5,684,965 |   | 11/1997 | Pickering .............................. 705/34 |
| 5,696,906 |   | 12/1997 | Peters et al. .......................... 705/34 |
| 5,699,276 |   | 12/1997 | Roos ................................ 379/106.3 |
| 5,699,528 | * | 12/1997 | Hogan .................................... 705/40 |
| 5,710,889 |   | 1/1998 | Clark et al. .......................... 345/344 |
| 5,724,525 |   | 3/1998 | Beyers, II et al. .................... 705/40 |
| 5,752,238 |   | 5/1998 | Dedrick ................................ 705/14 |
| 6,088,659 | * | 7/2000 | Kelley et al. ........................ 702/62 |
| 6,122,603 | * | 9/2000 | Budike, Jr. .......................... 705/412 |

FOREIGN PATENT DOCUMENTS 2 107 093 A * 4/1982 (GB) .

OTHER PUBLICATIONS

Beaty, Wayne; Improved Metering equipment an d techniques cut costs; Feb. 1995; Electric Light and Power; DialogWeb copy pp. 1–7.*

* cited by examiner

Primary Examiner—James P. Trammell
Assistant Examiner—Thomas A. Dixon
(74) Attorney, Agent, or Firm—Senniger, Powers, Leavitt & Roedel (57) ABSTRACT

An electronic energy management system is suitable for use with an energy distribution network that provides energy from an energy resource to user sites. A plurality of energy usage meters, at least one at each user site, monitors energy usage at each user site. The system comprises a data acquisition subsystem that acquires energy usage data from the energy usage meters. The energy usage data comprises multiple increments of total energy usage over defined periods of time. An electronic data storage located at a central location remote from the energy usage meters stores the acquired energy usage data. An electronic communication subsystem provides user access to the stored acquired energy usage data from the electronic data storage.

30 Claims, 9 Drawing Sheets

XYZ Plant — 300
kWh One Day - Table — 340
01/08/98 — 350
Units - kWh — 320

| | Thursday 01/08/98 | Total |
|---|---|---|
| XYZ-991524934 | 14,322 | 14,322 |
| XYZ-991524952 | 22,567 | 22,567 |
| XYZ-991657695 | 173,336 | 173,336 |
| XYZ-991657707 | 208,898 | 208,898 |
| XYZ-991813882 | 1,503 | 1,503 |
| XYZ-991819981 | 5,973 | 5,973 |
| TOTAL | 426,599 | 426,599 |

— 310
— 330

Select Chart Type: [Table ▽]

FIG.4

XYZ Plant — 400
ks-Weekends - Table — 420
01/24/98 - 02/08/98
Units - kW — 440

430

| PDQ Department | Saturday 01/24/98 | Sunday 01/25/98 | Saturday 01/31/98 | Sunday 02/01/98 | Saturday 02/07/98 | Sunday 02/08/98 |
|---|---|---|---|---|---|---|
| | 15,622 | 5,988 | 16,119 | 6,076 | 5,749 | 5,749 |

410

Export to text file.

Select Chart Type: Table ▽

FIG. 5

XYZ Plant — 500
kw - Weekends - Table
Saturday - 01/31/98 — 510
Units - kw — 520

| PDQ Department | | | | | | | |
|---|---|---|---|---|---|---|---|
| 00:00:00 | 16,118.78 | 00:15:00 | 14,474.88 | 00:30:00 | 13,087.49 | 00:45:00 | 12,257.66 |
| 01:00:00 | 12,162.05 | 01:15:00 | 11,825.66 | 01:30:00 | 11,196.67 | 01:45:00 | 11,226.62 |
| 02:00:00 | 10,742.78 | 02:15:00 | 10,320.38 | 02:30:00 | 10,018.94 | 02:45:00 | 10,055.81 |
| 03:00:00 | 9,911.04 | 03:15:00 | 9,801.60 | 03:30:00 | 9,970.56 | 03:45:00 | 8,687.23 |
| 04:00:00 | 8,565.50 | 04:15:00 | 8,760.19 | 04:30:00 | 8,955.65 | 04:45:00 | 8,205.31 |
| 05:00:00 | 8,447.23 | 05:15:00 | 8,435.71 | 05:30:00 | 8,580.48 | 05:45:00 | 8,337.79 |
| 06:00:00 | 8,419.20 | 06:15:00 | 8,206.08 | 06:30:00 | 8,240.64 | 06:45:00 | 8,347.78 |
| 07:00:00 | 8,237.18 | 07:15:00 | 7,874.30 | 07:30:00 | 7,862.78 | 07:45:00 | 7,620.86 |
| 08:00:00 | 7,499.14 | 08:15:00 | 7,620.10 | 08:30:00 | 7,717.25 | 08:45:00 | 7,608.58 |
| 09:00:00 | 7,596.29 | 09:15:00 | 7,741.82 | 09:30:00 | 7,729.54 | 09:45:00 | 7,754.11 |
| 10:00:00 | 7,753.34 | 10:15:00 | 7,729.54 | 10:30:00 | 7,850.50 | 10:45:00 | 7,729.54 |
| 11:00:00 | 7,741.82 | 11:15:00 | 7,862.02 | 11:30:00 | 7,717.25 | 11:45:00 | 7,982.98 |
| 12:00:00 | 7,783.54 | 12:15:00 | 7,717.25 | 12:30:00 | 7,886.59 | 12:45:00 | 7,754.11 |
| 13:00:00 | 7,765.63 | 13:15:00 | 7,741.82 | 13:30:00 | 7,886.59 | 13:45:00 | 7,784.30 |
| 14:00:00 | 7,754.11 | 14:15:00 | 7,632.38 | 14:30:00 | 7,765.63 | 14:45:00 | 7,766.40 |
| 15:00:00 | 7,632.38 | 15:15:00 | 7,741.82 | 15:30:00 | 7,644.67 | 15:45:00 | 7,633.15 |
| 16:00:00 | 7,668.48 | 16:15:00 | 7,657.73 | 16:30:00 | 7,656.96 | 16:45:00 | 7,766.40 |
| 17:00:00 | 7,777.95 | 17:15:00 | 7,656.96 | 17:30:00 | 7,790.98 | 17:45:00 | 7,790.21 |
| 18:00:00 | 7,778.69 | 18:15:00 | 7,911.17 | 18:30:00 | 7,585.15 | 18:45:00 | 7,598.21 |
| 19:00:00 | 7,488.00 | 19:15:00 | 7,609.73 | 19:30:00 | 7,477.25 | 19:45:00 | 7,597.44 |
| 20:00:00 | 7,367.81 | 20:15:00 | 7,719.17 | 20:30:00 | 7,343.23 | 20:45:00 | 7,621.25 |
| 21:00:00 | 7,477.25 | 21:15:00 | 7,356.29 | 21:30:00 | 7,200.00 | 21:45:00 | 7,212.29 |
| 22:00:00 | 7,065.98 | 22:15:00 | 7,090.56 | 22:30:00 | 7,066.75 | 22:45:00 | 6,777.98 |
| 23:00:00 | 5,907.46 | 23:15:00 | 5,701.63 | 23:30:00 | 5,435.90 | 23:45:00 | 5,412.86 |

- XYZ-991524934
- XYZ-991657695
- XYZ-991657707
- XYZ-991813882
- XYZ-991819981
- XYZ-991524952

— 530

Export to text file.

Select Chart Type: [ Table ▼ ]

ELECTRONIC ENERGY MANAGEMENT SYSTEM

FIELD OF THE INVENTION

The invention relates generally to an electronic energy management system. In particular, the invention relates to such systems that deliver realtime, near realtime, or incremental energy usage data to energy users.

BACKGROUND OF THE INVENTION

Energy users in general, and business customers in particular, often desire information relative to their energy use profile. This energy use information may be referred to as metering information. It is often unsatisfactory for business customers to wait a month or longer for their periodic energy bills to discover their energy usage rates. Moreover, the information provided on standard billing statements typically does not reflect all of the data that many customers need in order to make fully informed energy management decisions. For example, a single enterprise may have a large number of energy usage sites, with each site having multiple energy meters. The enterprise may need to know, among other things, not only its total energy use, but also its energy use per site (or subdivision thereof), its energy use per meter or meter group, and its incremental energy use over specific times.

Realtime or near realtime energy usage information provides a strategic tool for managers that allows them to make sound future and present business decisions. For example, an energy usage report provides insight as to energy usage and demand schedules. Access to such information helps managers make better, more informed, operating decisions. Further, access to incremental energy use information can help identify unknown or unexpected energy costs. Reducing or accounting for unexpected energy costs can result in overall cost savings. Finally, accurate, reliable and timely energy use information provides an informational advantage to firms negotiating for energy rates from local, regional and national energy suppliers.

The market for metering information is also expanding due to technological advances that make providing and using such information feasible and reliable. For example, developments in wireless data communication systems allow faster, wider deployment of data collection networks. These systems can provide realtime or near realtime data at relatively low costs. Moreover, rapid developments in data distribution networks such as the Internet and World-Wide-Web (or "the web") allow easy access to central data storage facilities. The Internet also provides a relatively time independent mode of information dissemination. In other words, users can access a data server at the users' convenience—users need not wait for a bill or other information to arrive. Thus, the Internet gives modern businesses additional information with more flexibility.

Not only have technological advances expanded the market for meter information, regulatory and other forces have likewise increased the demand for realtime, near realtime, or incremental energy usage information. For instance, changes are underway in the wholesale energy market, as overseen by federal regulatory agencies. There further appears to be a shift towards deregulation and increased retail competition, which is generally overseen by state regulatory commissions and agencies.

Perhaps the best example for exploring trends is the electric power industry. Historically, electric power firms have been vertically integrated among three functions: (1) generating electricity; (2) transmitting electricity; and (3) delivering electricity. State public utility commissions typically grant exclusive electric power franchise areas in exchange for an obligation that the franchisee will serve all customers within the area at regulated rates that bundle the three functions together.

In the electric power industry, as of early 1998, an important phase of the transition to retail competition was nearly complete. About fourteen states, together accounting for roughly forty percent of the United States population (i.e., most of the "high cost" states), have adopted retail competition. However, the timing of competitive entry, and the terms and structure of competitive entry vary between the states.

Thus, as retail competition evolves, incumbent firms must fight to keep customers. Similarly, new entrants to an area will fight to take away existing customers. From an economic perspective, such competition will likely lead to falling prices and profit margins. Thus, firms must respond by providing improvements to existing services and offer new services. One such service is metering information service. Further, the new and improved services should be offered on flexible terms such that the different needs of different customers are adequately addressed.

One such improved service is an electronic energy management system. Such a system should provide information that allows customers to do the following: (1) understand their energy usage; (2) manage and improve control of their energy usage and consumption; (3) allocate costs to specific departments, functions or other organizational components of interest; and (4) reduce energy expenses by having the up-to-date energy information necessary to negotiate a successful energy contract.

While it has been generally discussed in the context of electricity, the same advantages are possible for other energy resources as well.

There is a need for an electronic energy management system that provides realtime or near realtime access to incremental energy usage data.

SUMMARY OF THE INVENTION

It is therefore seen to be desirable to provide an electronic energy management system that provides accurate and timely energy usage data to energy customers. It is further desirable to provide an electronic energy management system that automatically acquires incremental energy usage data and provides that data to a storage facility for access and processing by energy customers. It is also desirable to provide an electronic energy management system that transmits incremental energy usage data via a wireless communication channel. It is further desirable to provide an electronic energy management system for use with diverse energy resources such as electricity, natural gas, compressed air, water and other industrial fluids. It is also desirable to provide an electronic energy management system that employs a server computer and a multipurpose communication network such as the Internet to allow customer access to their energy usage information. It is further seen to be desirable to provide a secure electronic energy management system. It is also desirable to provide an electronic energy management system that provides customers with a variety of report formats for viewing and analyzing the customers' energy use data. It is further desirable to provide an electronic energy management system in which users may view energy use data in terms of consumption, demand, cost per rate of consumption or total cost. It is further seen to be desirable to provide an electronic energy management system wherein customers do not have purchase additional software in order to employ the system.

The invention comprises an electronic energy management system for use with an energy distribution network. The energy distribution network provides energy from an energy resource to user sites. A plurality of energy usage meters, at least one at each user site, monitor energy usage at each user site. The system comprises a data acquisition subsystem that acquires energy usage data from the energy usage meters. The energy usage data comprises multiple increments of total energy usage over defined periods of time. An electronic data storage, located at a central location remote from the energy usage meters, stores the acquired energy usage data. An electronic communication subsystem provides user access to the stored acquired energy usage data from the electronic data storage.

The invention further comprises an electronic energy management system for use with an energy distribution network. The energy distribution network provides energy from an energy resource to user sites. The invention comprises a plurality of energy usage meters, at least one located at each user site. The plurality of energy usage meters monitor energy usage at each user site. A data acquisition subsystem acquires energy usage data from the energy usage meters. An electronic data storage, located at a central location remote from the energy usage meters, stores the acquired energy usage data. An electronic communication subsystem provides user access to the stored acquired energy usage data from the electronic data storage.

BRIEF DESCRIPTION OF THE DRAWINGS

FIG. 5 is a sample of energy usage data in a table format, in kilowatts, organized by meter group for each of several selected days that could be displayed to a system user in a display format in accordance with aspects of the present invention.

DETAILED DESCRIPTION OF PREFERRED EMBODIMENTS

Figure 1A:
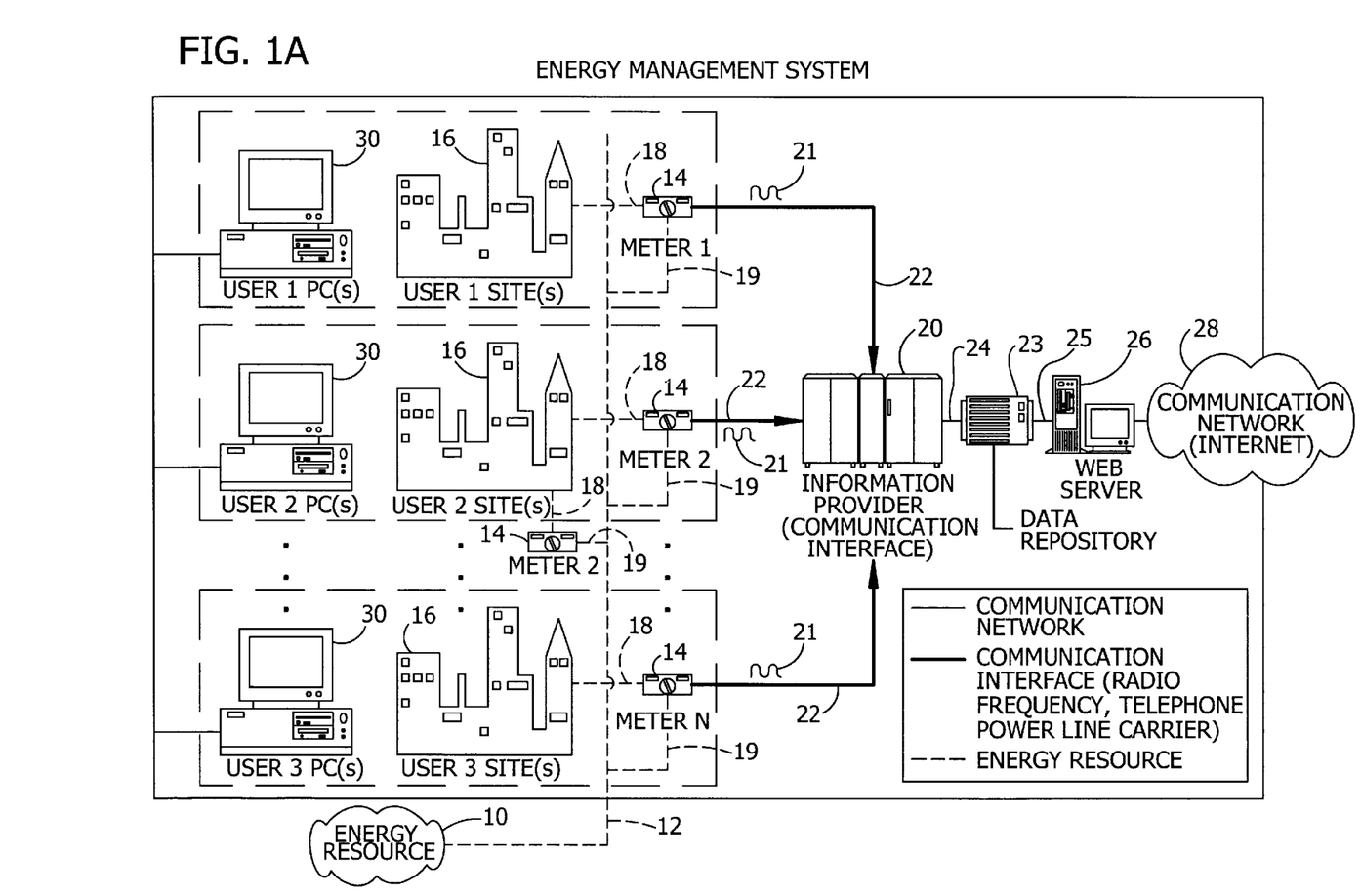
FIG. 1A is a system-level diagram of a preferred embodiment of an electronic energy management system according to the present invention.

FIG. 1A is a system-level diagram of a preferred embodiment of an electronic energy management system according to the present invention. An energy resource 10 is connected to a plurality of energy usage meters 14 via an energy distribution network 12. The distribution network 12 may also be referred to as a "grid" or "distribution grid." The meters 14 are, in turn, connected to various user sites 16 via hookup lines 18 and taps 19. Each user site 16 is connected to at least one meter 14. However, each user site 16 may also be connected to more than one meter 14 by more than one tap 19 and more than one hookup line 18 (see meter 2' in FIG. 1A). In other words, a single user site 16 may comprise multiple meters 14 but a single meter 14 is not typically connected to multiple user sites 16.

The meters 14 are also connected as an input to an information provider 20 via a communication interface 22. The information provider 20 may also be referred to as a central station. The other side of the information provider 20 is connected to a data repository 23 via line 24. The data repository 23 is further connected to a web server computer 26 via line 25. Web server computer 26 may also be referred to as an application server or similar device for storing and/or providing data and information. Those skilled in the art will recognize that lines 24 and 25 may be constructed from standard communication means. For example, lines 24 and 25 may be physical direct connections; telecommunication connections, wireless connections, local or wide area network connections, or the like.

An energy usage signal 21 transmits incremental energy usage data to the information provider 20 via the communication interface 22. The energy usage signal 21 originates in the meter 14. The information provider 20, in turn, extracts the incremental energy usage data from the energy usage signal for storage in the data repository 23.

Information stored in the data repository 23 is available to users via a communication network 28. In the preferred embodiment shown in FIG. 1A, the communication network 28 comprises a multipurpose, multiuser system such as the Internet. Other, more limited purpose communication networks may also be employed. For example, rather than using the Internet, the communication network 28 may comprise a dedicated connection, a local area network, a direct dial modem connection or similar communication links.

Users can access the web server computer 26 via the communication network 28 from personal computers PCs 30. Advantageously, the user PCs 30 need not be commonly located with the user sites 16. Users such as energy managers can monitor energy usage information at locations remote from the actual energy usage sites if they so desire. Thus, FIG. 1A illustrates the PCs 30 located adjacent there respective the user sites 16 for convenience and associational reasons only. Further, while it is expected that most users will access the communication network 28 via some form of a personal computer (PC 30), it is to be understood that other computer and communication devices currently exist that perform as an equivalent to a PC for the purposes of the present invention. For example, users could access the web server computer 26 from a variety of desktop computers, minicomputers, microcomputers, mainframe computers, UNIX workstations and the like. In short, access can be made by any system that provides Internet access or a similar capability.

The energy resource 10 shown in FIG. 1A may comprise one or several energy resources. For example, energy resource 10 may comprise electricity, natural gas, compressed air, water or other industrial fluids. In the case of electricity, energy resource 10 would typically be the electricity provided from an electrical power generation plant and the energy distribution network 12 would typically comprise a standard electrical power grid.

In operation, the energy distribution network 12 provides the energy resource 10 to user sites 16 via utility meters 14. Those skilled in the art will understand that as energy requirements at a particular user site 16 increase or decrease, the amount of the energy resource 10 provided to the user site 16, via meter 14, should likewise increase or decrease.

The utility meters 14 monitor and records the incremental energy usage at the user sites 16. The preferred configuration of utility meters 14 is described in greater detail below with respect to FIG. 1B. Periodically (e.g., every five minutes), each active meter 14 transmits the energy usage signal 21 (representative of the total energy consumed during one or more time periods) to the information provider 20 via the communication interface 22. The energy usage signal 21 from a particular meter 14 has a first parameter, such as a digital value, indicative of the incremental energy usage measured by that particular meter 14. Further, energy usage signal 21 includes a second parameter, such as an alphanumeric value identifying the meter and indicative of the particular meter 14 from which the incremental energy usage data was derived.

The energy usage data is then transferred and stored in the data repository 23. In particular, the information provider 20 periodically transmits the incremental energy usage data to the data repository 23. The frequency of this periodic transmission may vary depending upon a particular user's needs. For example, the data could be transmitted every twenty-four hours, during an off-peak time (e.g., midnight). The data repository 23, in turn, updates the existing energy usage information to reflect the additional incremental energy usage data.

It should be understood, however, that there are many ways for transferring the information from the meter 14 to the data repository 23. The foregoing is illustrative of the preferred methods and structures. For example, it is possible that the information provider 20 and data repository 23 are integrated into a single subsystem. Further, it is possible that the data exchange between the meters 14, information provider 20 and data repository 23 could be purely event driven and asynchronous rather than periodic.

In the preferred embodiment of FIG. 1A, the communication interface 22 comprises a wireless communication interface such as, for example, a cellular network. The utility meters 14 transmit energy usage data to the information provider 20 via this wireless communication interface. Further, in the preferred embodiment, the information provider 20 and the wireless communication interface are provided by a third party cellular communications provider, namely CELLNET. CELLNET comprises a radio frequency system and meter transmitter that allows any CELLNET compatible meter to be read remotely on much the same principles as a cellular telephone system. Other methods of transmitting data, include, in part, imposing a carrier signal onto the energy distribution network. This carrier signal, in turn, carries the energy usage signal 21. A demodulator associated with the information provider 20 then extracts the energy usage signal information from the energy distribution network. Further, rather than using a wireless communication interface, any of a variety of telecommunications networks may be used without any significant changes to the system. For example, a telephone or cable TV line, the internet or similar means may be used. Further, such lines may include wire or fiber optic connections.

One of the advantages of using a cellular system is that many energy resource providers have or likely will install cellular ready meters. Such cellular ready meters eliminate the need for manual meter reading. Moreover, customers that are outside of the cellular system, may still transmit their energy usage data via a telephone line or a similar communication device.

Users can access their particular energy usage information, as stored in the data repository 23, via the communication network 28. From a remote computer such as user PC 30, a user may identify the web server 26 as the desired destination using one of a number of widely available and versatile software programs for browsing the Internet and World-Wide-Web. Such programs are commonly referred to as "web browsers." Two well known web browsers are NETSCAPE and Microsoft's INTERNET EXPLORER.

General access to the front end or initial web page of the web server computer 26 is not limited to particular users. Access to a specific user's energy usage data is, however, restricted. Similarly, access restrictions may be made at the meter level, user site level, user enterprise level and so on. Those skilled in the art will recognize that there are a variety of means for restricting access. Such means include, for example, user names coupled with passwords and data encryption methodologies and devices. The preferred embodiment of the electronic energy management system of the present invention employs user names coupled with passwords.

Thus, FIG. 1A illustrates an electronic energy management system for use with an energy distribution network 12. The energy distribution network 12 provides energy to user sites 16 from an energy resource 10. A plurality of energy usage meters 14, at least one such meter located at each user site 16, monitors the energy usage at the associated user site 16. The electronic energy management system comprises a data acquisition subsystem that acquires energy usage data from the energy usage meters 14. The data acquisition subsystem includes the information provider 20 and the communication interface 22. The data repository 23 is an electronic data storage and is located remotely from the energy usage meters 14. The data repository 23 stores the energy usage data acquired by the data acquisition subsystem. The electronic energy management system also comprises an electronic communication subsystem. The electronic communication subsystem includes a communication network 28, a server computer 26 and may include one or more user PCs 30. The electronic communication subsystem provides user access to the stored acquired energy usage data from the data repository 23.

The energy usage meters 14 of FIG. 1A are adapted to reflect the type of energy resource 10 that is being used. For example, when the energy resource 10 is electricity, the energy resource meters 14 measure electricity. One particularly well suited energy resource meter 14 for measuring electricity comprises a watt-hour meter. A further improvement provides a watt-hour meter that includes an integration circuit for providing a watt-hour signal having a parameter representative of the active or reactive power flowing through the meter 14. If such a watt-hour meter is used in FIG. 1A, then energy usage signal 21 comprises the watt-hour signal.

If the energy resource 10 is a fluid, such as, for example, water, then meter 14 comprises a fluid meter for providing a liquid flow signal. Similar to the watt-hour meter discussed above, the fluid meter could further be devised to provide an integration circuit for providing a liquid flow signal representative of the time integral of the active liquid flow through the meter 14.

It should be noted, however, that while FIG. 1A illustrates a single energy usage signal 21 between each meter 14 and the information provider 20, there is no reason that multiple signals could not be transmitted to the information provider 20 via the communication interface 22. For example, energy usage meter 14 could provide a first signal representative of instantaneous energy usage, and a second signal representative of average energy usage. Moreover, energy usage meter 14 could be designed to assemble and distribute dissimilar energy resource data. For example, the energy usage meter 14 could be modified provide energy usage data for both electricity and natural gas.

Figure 1B:
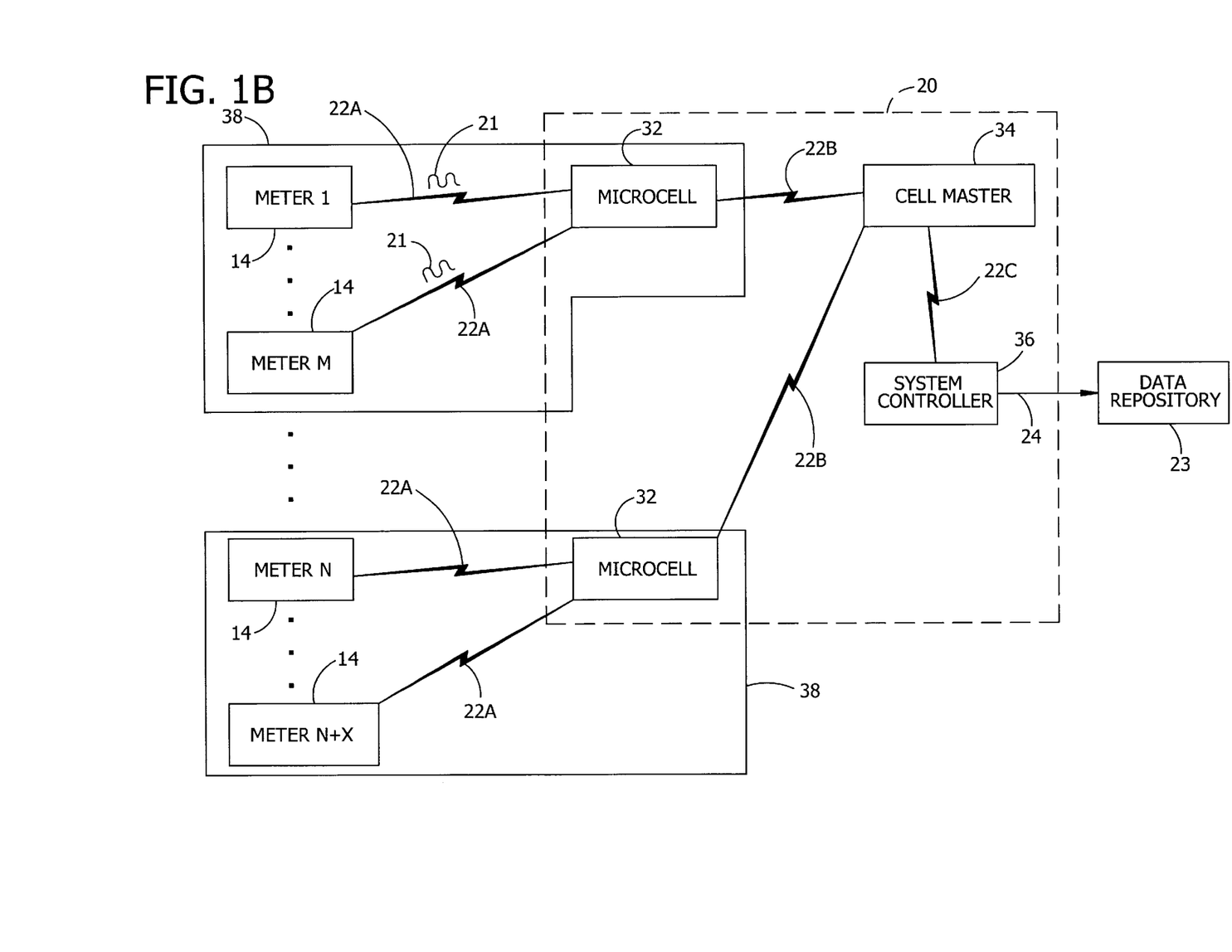
FIG. 1B is a diagram of a data acquisition subsystem for use with the present invention in which meter data is transmitted to an information provider/central station.

FIG. 1B illustrates a preferred embodiment of a data acquisition subsystem for use with an electronic energy management system according to the present invention. The energy usage meter 14 communicates with a microcell 32 via wireless communication link 22A. The meter 14 and microcell 32 are shown enclosed within a solid box 38 to reflect the fact that the microcell 32 and meter 14 are typically located at the same user site. In particular, the microcell 32 is positioned at a fixed location at or near the user site 16 (FIG. 1A). The meter 14 is also located at the user site 16 but may be moved to different locations within the user site 16. The microcell 32 communicates with a cell master 34 (a cellular master station) via wireless communication link 22B. Typically, a single cell master 34 serves multiple microcells 32. The cell master 34 is, in turn, connected to a system controller 36 via a wireless communication link 22C. Finally, the system controller 36 is connected to the data repository 23 via line 24. Thus, the cellular communication network is organized as a hierarchy. In other words, a single microcell 32 accommodates data from a plurality of meters 14; a single cell master 34 accommodates data from a plurality of microcells 32 and so on. The number of levels of the hierarchy could vary depending upon local cellular or telecommunication service availability.

Microcell 32, cell master 34 and system controller 36 are enclosed within a box drawn in phantom to reflect that these components together comprise the information provider 20 identified in FIG. 1A. Further, communication links 22A, 22B and 22C comprise the communication interface 22 discussed with respect to FIG. 1A. It is to be understood that one or more of wireless communication links 22A, 22B and 22C may be replaced individually or completely with wireless communication alternatives and substitutes such as phone lines, the internet, local area networks and other telecommunication means.

In the preferred embodiment, the meter 14 transmits energy usage data to the microcell 32 periodically (e.g., every five minutes) via wireless link 22A. In order to reduce the risk of data loss or corruption, each periodic transmission includes the most recent energy usage data, as well as prior energy usage data for a number prior transmissions (e.g., ten prior transmissions).

The microcell 32 accumulates the periodic energy usage data for an entire monitoring period and then transmits a package of that data to the cell master 34. For example, the microcell 32 could gather the information from the meters 14 for an entire day and then make a single daily transfer to the cell master 34. The inherent flexibility of the system, however, allows timing other than daily.

The cell master 34 functions as an intermediary and transfers or relays the data from the microcell 32 to the system controller 36. The system controller 36, in turn, communicates the data to the data repository 23. In the preferred embodiment, the system controller 36 is located at the same site as the data repository 23. The system controller 36 and cell master 34 are located at strategic cellular locations not necessarily at the site of the data repository 23.

Preferably, the meters 14 are solid state devices. An information gathering cellular communication board is installed in each meter 14 to facilitate the wireless link 22A with the microcell 32. In a typical energy meter 14, the meter provides pulses that indicate a specified amount of energy has been consumed. For example, if the energy source is electricity, each pulse reflects a percentage of a kilowatt-hour of consumption. If the energy source is a gas or fluid, each pulse reflects a percentage of a cubic foot of gas or fluid. The communication board counts the number of pulses which provides an indication of the energy usage. It is this information that is then transmitted via wireless link 22A to the microcell 32 periodically (e.g., every five minutes).

It should be noted that even if the meters 14 are not solid state devices, but rather comprise analog meters, such analog meters may be modified to accommodate a communication device. Such a modification, once made, would allow the use of an analog meter with the electronic energy management system of the present invention.

Periodically, the communication board transmits the energy usage signal 21 to the microcell 32 via the communication interface 22A. As noted above with respect to FIG. 1A, the energy usage signal 21 has a first parameter indicative of the incremental energy usage associated with that particular meter 14. Further, the energy usage signal 21 also includes a second parameter indicative of the particular meter 14 from which the incremental energy usage data was derived.

Figure 2A:
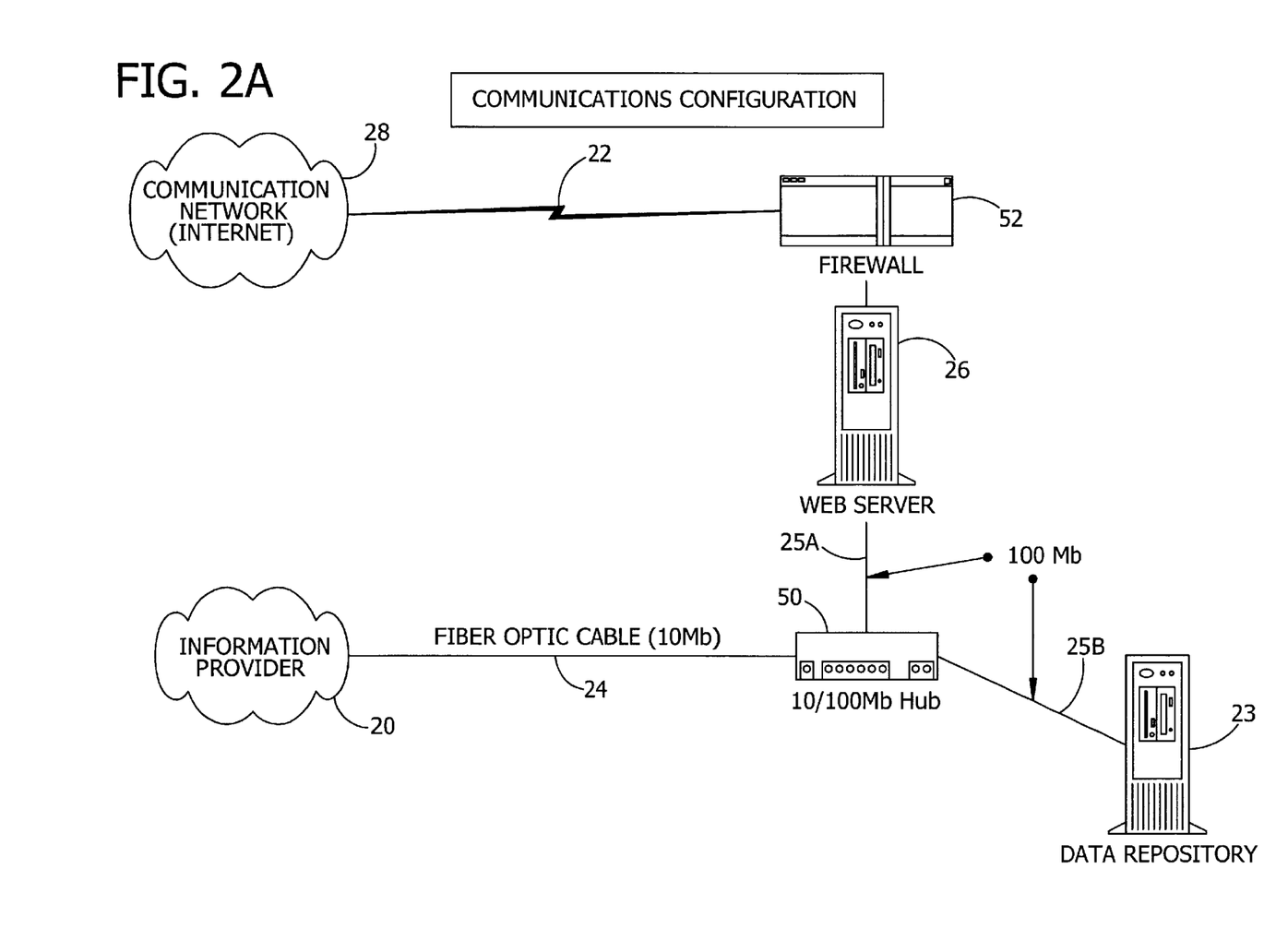
FIG. 2A is a communication system diagram of a preferred embodiment of an electronic energy management system according to the present invention.

FIG. 2A illustrates a preferred embodiment of the specific interconnections used between the communications network 28, web server computer 26, information provider 20, and data repository 23. As shown in FIG. 2A, the information provider 20 is connected to an interface hub 50 via line 24. In FIG. 2A, line 24 comprises a 10 megabit (Mb) fiber optic cable connection. The fiber optic line 24 preferably comprises a secure connection via a firewall (not shown in FIG. 2A).

Interface hub 50 is further connected to the data repository 23 and the web server computer 26. In particular, the interface hub 50 is connected to the web server computer 26 via a first 100 Mb ethernet connection line 25A. The data repository 23 is similarly connected to the interface hub 50 via a second 100 MB ethernet connection line 25B. Finally, web server computer 26 is connected to the communication network 28 via a firewall 52 and communication interface 22. Those skilled in the art will be familiar with the operation of firewalls, and as such, firewall 52 need not be described in detail.

Energy usage data, as supplied to the information provider 20 is fed to the data repository on line 24 via interface hub 50. When energy customers desire information regarding their energy usage, they may connect to the web server computer 26 via the communication network 28. The web server computer 26, in turn, accesses specific data from the data repository via lines 25A and 25B. As discussed above with respect to FIG. 1A, access to specific data is limited by the use of user names and passwords.

As is known in the art, when a user accesses a web server such as web server computer 26, the web server typically provides an initial display (the initial web page). In the electronic energy management system of the present invention, users who wish to access their specific energy usage data are prompted to enter their user name and a password. If the user name and password are accepted by the web server computer 26, the user receives a limited admission to access additional information provided via subsequent web page displays. Admission is characterized as limited because a user cannot review or access the energy usage information of another user without knowing the other user's user name and password.

Figure 2B:
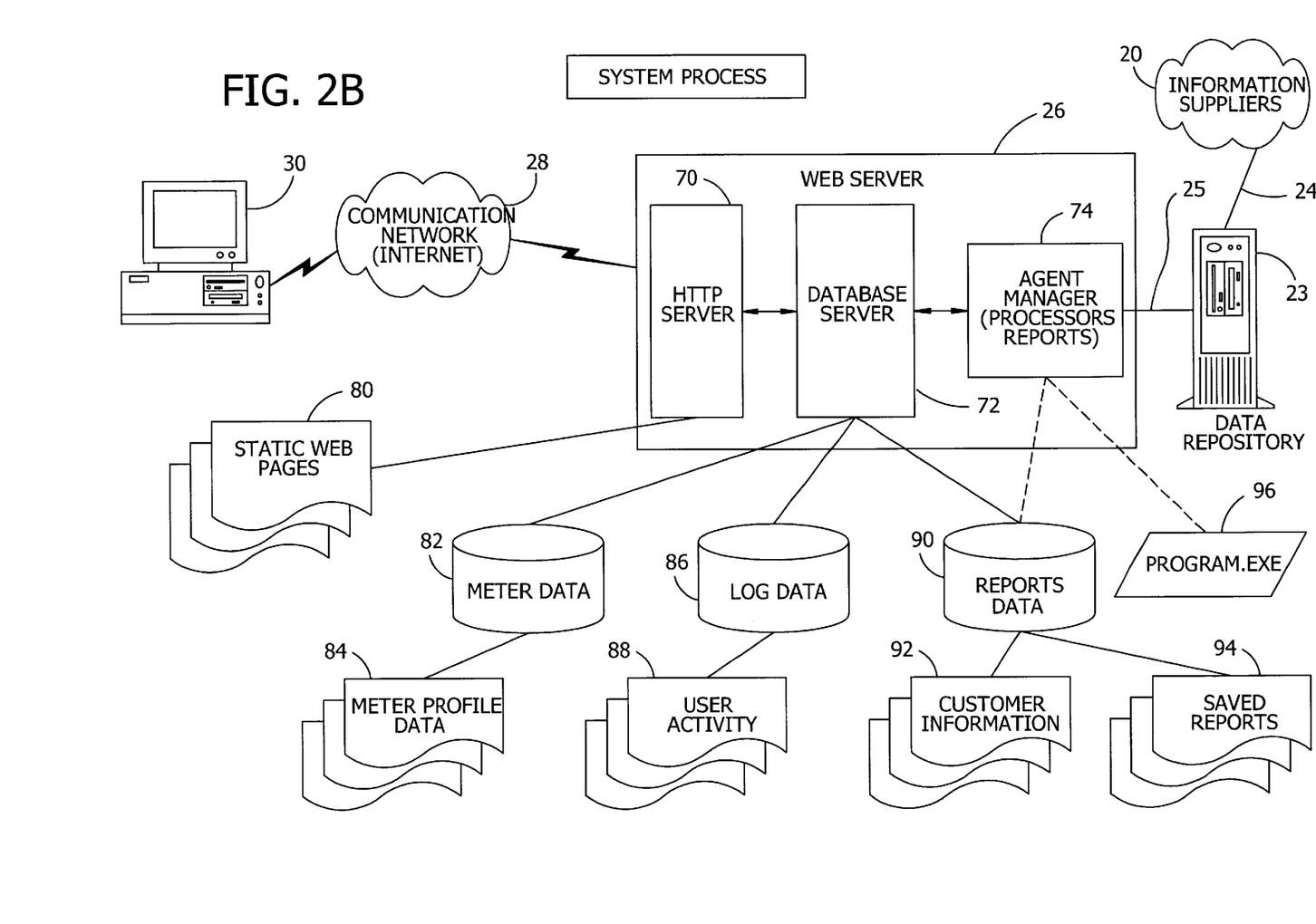
FIG. 2B is a system process diagram of a preferred embodiment of an electronic energy management system according to the present invention.

FIG. 2B is a system process diagram for a preferred embodiment of the electronic energy management system according to the present invention. The web server computer 26 comprises three functional components: (1) an HTTP server 70; (2) a database server 72; and (3) an agent manager 74. The operation of each of these functions is described further below. In general, data manipulation and data presentation are accomplished in the web server computer 26. Raw data storage is accomplished in the data repository 23. In the preferred embodiment, users have no access to the data repository 23; any data that is necessary to process a user's query is copied into the web server computer 26 for temporary use and storage.

Those skilled in the art will understand that the HTTP server 70 provides the primary graphical user interface for the web server computer 26 to be used with the users web browser. HTTP server 70 provides static web pages 80 for display as shown. Static web pages 80 are the display building blocks of the web server computer 26 and reflect the displays prior to inclusion of user specific data. Operation of HTTP servers is well known in the art and, as such, need not be discussed further.

The web server computer 26 also employs a database server 72 to manage three databases. First, a meter data database 82 and associated meter profile data files 84 reflect the user's incremental meter data, This data, however, is actually a copy of the raw data that is stored in the data repository 23. When a particular user disconnects from the web server computer 26, that particular user's meter data may be deleted from the meter data database 82.

A second database is the log data database 86. The log data database 86 stores what may be generally termed as web server "overhead" data. For example, the log data database 86 stores event logs that indicate who accessed the web server computer 26, and when that access occurred. The log data database 86 also stores authentication information and the like. The log data database 86 stores and retrieves the data from a set of user activity records 88.

A third database is a reports data database 90. The reports data database 90 is used to actually prepare user requested report information. The reports data database 90 works in conjunction with customer information records 92 and saved reports records 94. User profiles may be saved on the web server computer 26 so that users need not specify their report preferences each time they access the system. The various report formats available are described in further detail with respect to FIGS. 3 through 7 below.

An agent manager 74, functionally located within the web server computer 26, operates in conjunction with the data repository 23 and an executable program 96 to generate user requested reports. In general, the executable program 96 provides overall program control. When a user requests a particular report, the executable program 96 causes the agent manager 74 to access the requested data from the data repository 23. The data is then placed into the meter profile data records 84. The data is merged with the report format information from the reports data database 90 to provide the user requested report. Note, however, in order to maintain the integrity of the data repository 23, the agent manager 74 does not permit users to write to, or otherwise directly access, data stored in the data repository 23.

An advantage of the executable program 96 is that updates and improvements to the electronic energy management system may be made in a "transparent" fashion. The term transparent is used because users need not update their computers or web browsers in order to take advantage of system updates. Transparent does not necessarily mean that users will not be able to see or appreciate a particular software update. For example, if a new user display format may be made available without the user having to purchase or upgrade any software.

If data manipulation is required, that manipulation is accomplished in the web server computer 26 by the executable program 96. For example, if the meter profile data is stored in terms of kilowatt-hours and a user requests data in terms of cost, a cost-to-kilowatt-hours conversion routine is executed that manipulates the kilowatt-hour information such that cost information may be obtained. Such manipulation may be as simple as using a standard ratio, or it could be complex if energy usage is billed at different rates for different customers or different times of day.

One particular advantage of the electronic energy management system of the present invention is the ability to provide energy usage information in a large number of formats and to varying degrees of detail. For example, the information provider 20 and communication interface 22 may be configured to acquire energy usage data from the meters 14 at preset times (i.e., schedule driven) or as necessary (i.e., interrupt driven). The data may then be summarized and integrated for the intervals between preset times. Thus, users can monitor trends in energy usage.

FIGS. 3 through 7 provide examples of computer display reports of energy usage information in various formats. The display formats shown in FIGS. 3 through 7 depict reports particularly suited for electric power usage. In each case, the web server computer 26 (see FIG. 1) acts as a report generator and generates a report representative of energy usage data associated with one or more of the meters 14 associated with one or more of the user sites 16.

Figure 3:
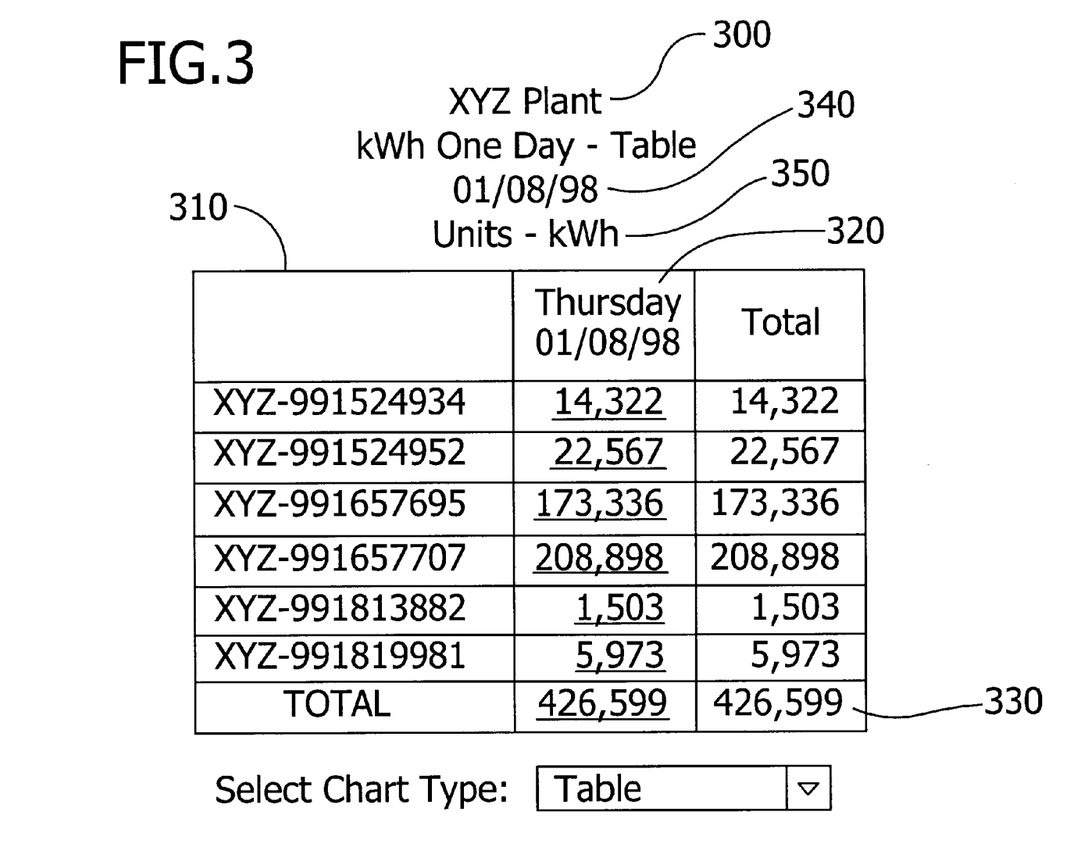
FIG. 3 is a sample table of energy usage data in kilowatt-hours for all meters associated with a user on a single day that could be displayed to a system user in a display format in accordance with aspects of the present invention.

FIG. 3 shows a report in table format for a selected day. The energy usage information is provided in terms of consumption (kilowatt-hours) as indicated by reference character 350. In the example shown in FIG. 3, a user 300 has selected six meters for display. Column 310 indicates the particular meters selected. Column 320 indicates the date chosen. Row 330 provides a total of the energy usage for the selected meters for the selected date.

It is to be understood that subgroups of meters or a single meter could also be selected. Further, the table shown in FIG. 3 could be expanded to cover additional days or other time periods. The energy usage information may be provided not only in terms of consumption, but also demand (kilowatts), total cost (dollars), cost per kilowatt-hour, and similar. Finally, if the energy resource is something other than electricity, the above-noted information would be modified to reflect the appropriate units of energy (e.g., cubic feet of gas or gallons of fluid per hour).

Figure 4:
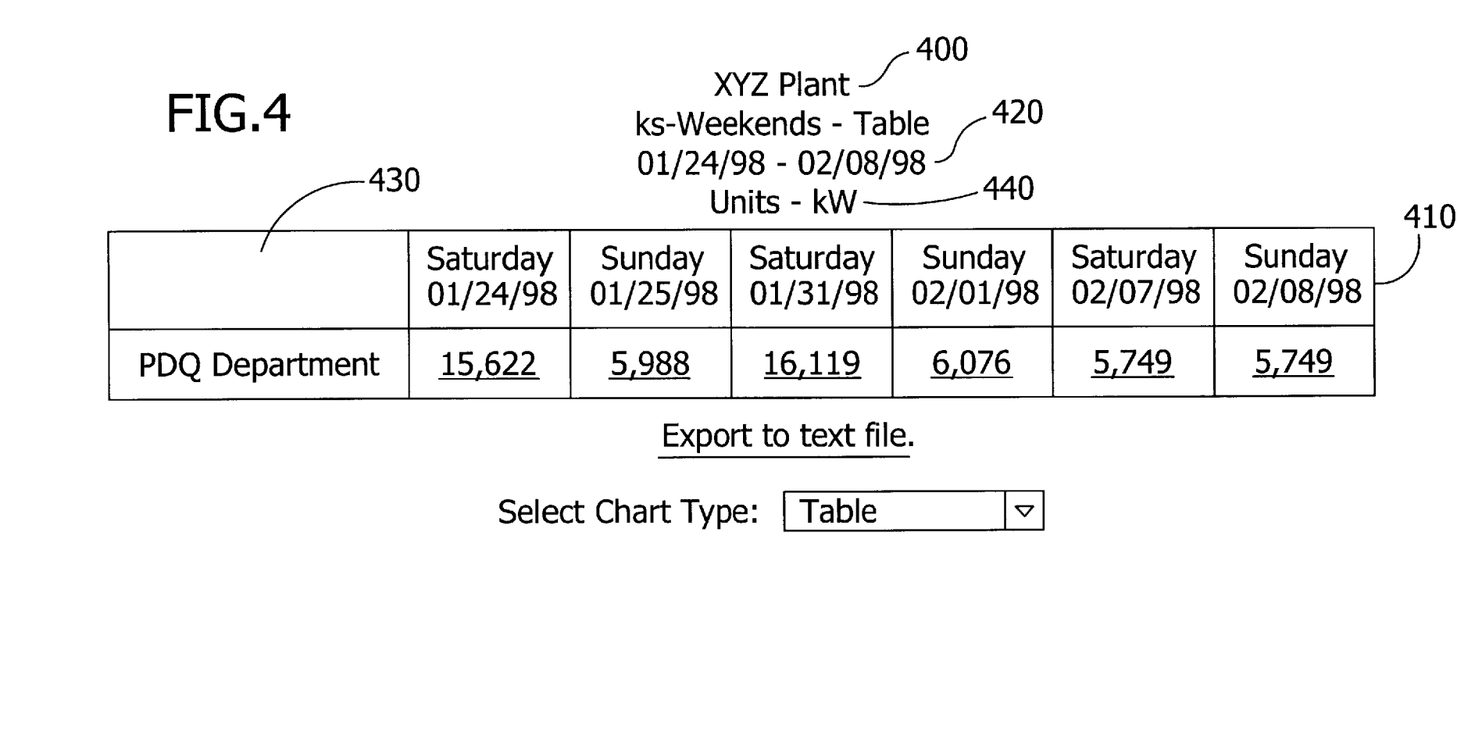
FIG. 4 is a sample table of energy usage data in kilowatts organized by meter group for each of several selected days that could be displayed to a system user in a display format in accordance with aspects of the present invention.

FIG. 4 illustrates a web page display in table format wherein a user 400 has restricted the data to three particular weekends as shown by row 410 and reference character 420. Column 430 illustrates that the user has requested the data for a particular group of meters associated with the PDQ Department. Thus, a manager charged with monitoring energy usage may determine not only the total enterprise usage rates, but may also determine energy usage by department (or by similar enterprise subdivision). In the example shown in FIG. 4, reference character 440 identifies that the energy usage information is provided in terms of demand (kilowatts).

FIG. 5 illustrates the capability for users to inquire into additional (i.e., finer) levels of resolution upon demand. This is referred to as a "drill down" capability. In FIG. 5, a user 500 has opted to drill down from the information provided in FIG. 4. In the table shown in FIG. 5, the user 500 chose to look at a single day 510 (Saturday, 1/31/98) for a specific meter group 520 (PDQ Department). The particular meters 530 associated with meter group 520 are also identified as part of the display. Thus, if the user 500 wishes to limit the display to a particular meter within meter group 520, the user 500 need only select the particular meter from the listing of meters 530. As can be seen in the table, information is provided in fifteen minute increments for an entire twenty-four hour period. Drill down capability is generally available from any higher-level chart format.

Thus, FIG. 4 provides a first display format and FIG. 5 provides a second display format wherein the energy usage data displayed on the second display format is displayed to a finer degree of resolution than on the first display format.

Figure 6:
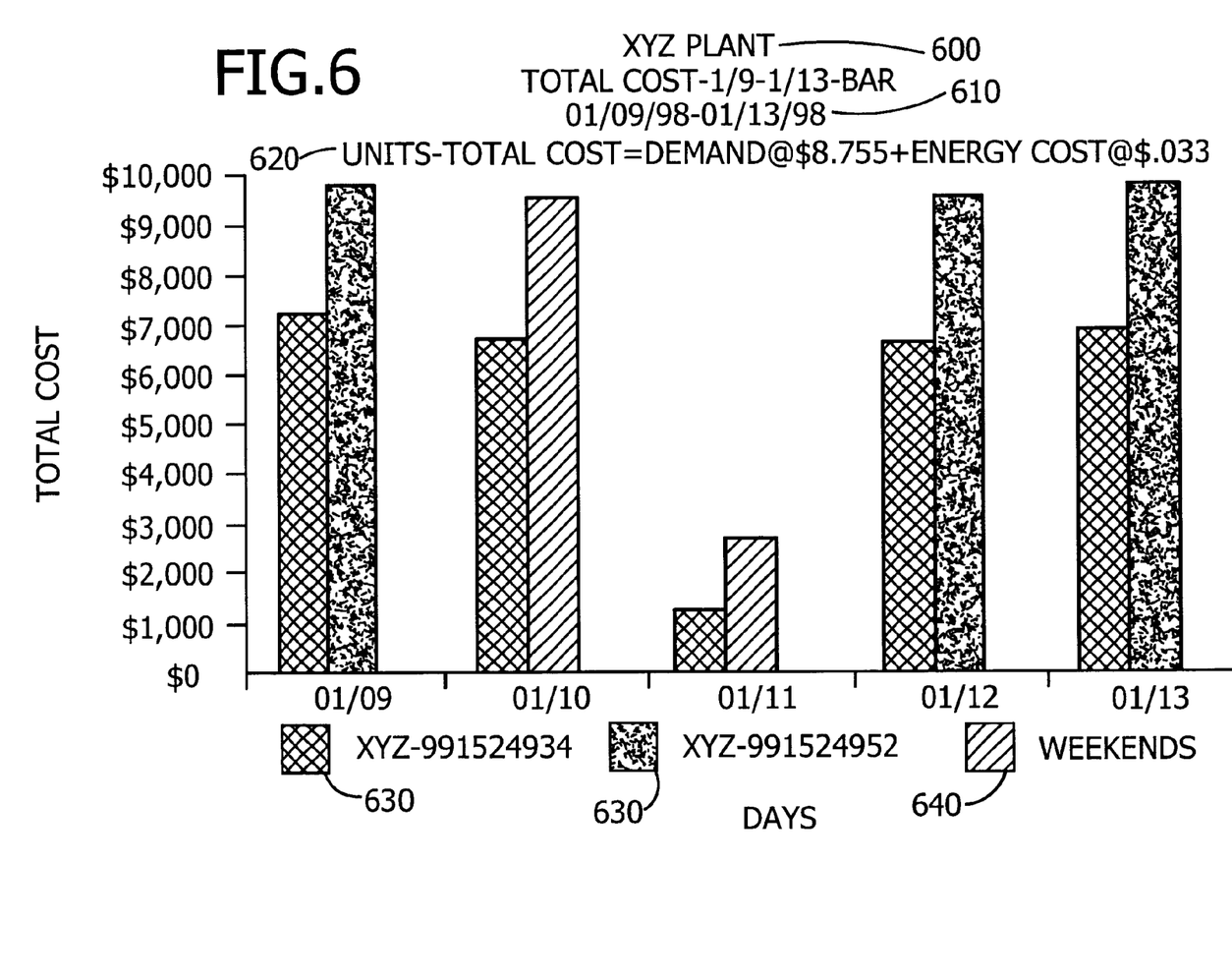
FIG. 6 is a sample of energy usage data in a bar chart format, in total cost, for two specific meters for each of several selected days that could be displayed to a system user in a display format in accordance with aspects of the present invention.

FIG. 6 depicts energy usage in a bar chart format. In FIG. 6, a user 600 has selected five consecutive days 610 for display. The energy usage information is displayed in terms of total cost 620. Total cost may be determined by multiplying the number of kilowatts by the cost per kilowatt. Similarly, total cost may also be determined by multiplying kilowatt-hours by the cost per kilowatt-hour. The bar chart shown in FIG. 6 displays information for two specific meters 630 (as opposed to an entire department or enterprise which is also possible) over five twenty-four hour periods. The chart further indicates if the selected day is a weekend 640.

Figure 7:
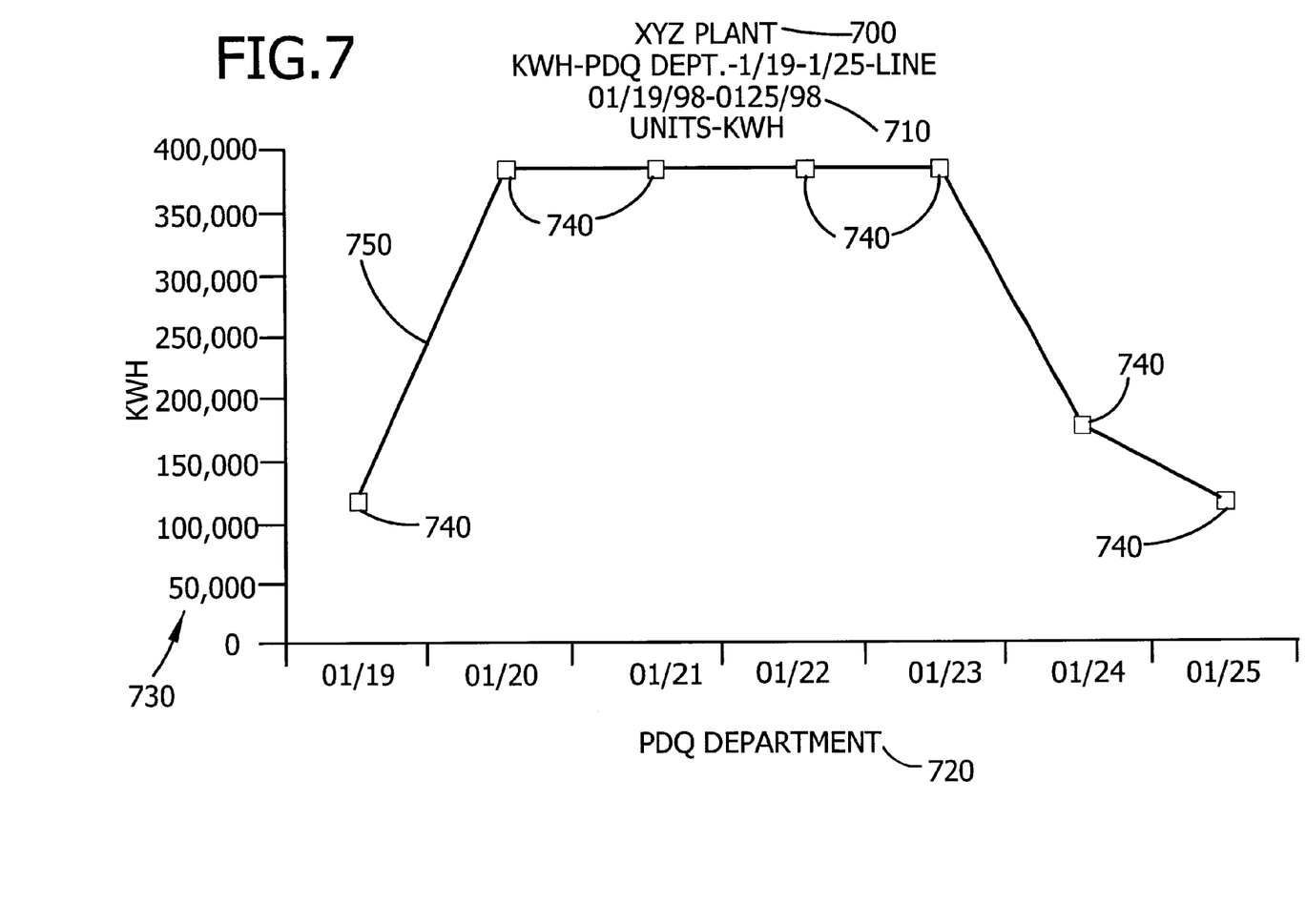
FIG. 7 is a sample of energy usage data in a line chart format, in kilowatt hours, organized by meter group and plotted for each of several selected days that could be displayed to a system user in a display format in accordance with aspects of the present invention.

FIG. 7 shows a report in line chart format. In FIG. 7, a user 700 has selected for display a particular week 710 (01/19/98 through 01/25/98), and a full twenty-four hours of information for each day selected. Further, like FIG. 4 above, FIG. 7 displays the data for a particular meter group 720 (the PDQ Department). Finally, the energy usage data is presented in terms of consumption 730 (kilowatt-hours). It should be noted that while the report is in line chart format, however the data reflected is not continuous as line 750 may otherwise indicate. A separate data point 740 indicates the energy usage for each day selected. The data points 740 are then connected by a line to complete the line chart. Note also, that on the actual display, data points 740 may or may not be indicated apart from the line 750.

It is to be understood that the foregoing FIGS. 3 through 7 are provided to illustrate the flexibility and adaptability of the electronic energy management system of the present invention. Other display formats are possible and within the subject matter of the invention. Importantly, however, FIGS. 3 through 7 illustrate the availability of customizable reports that reflect each energy user's specific operating requirements. From a temporal perspective, reports can be based on, for example, specific dates or periods of dates and times, specific weekdays or weekends, or specific work shifts. Further, the reports may be displayed in small time increments (e.g., fifteen minutes) or larger time increments (e.g., daily, weekly or monthly).

FIGS. 4 and 7 illustrate another advantageous aspect of the electronic energy management system described herein. The flexibility of the invention allows for dynamic meter grouping. In FIGS. 4 and 7, for example, energy usage data is grouped for all meters within a particular department (the PDQ Department). This dynamic grouping allows managers and user to make logical grouping of meters for analytical purposes. An additional advantage is that the grouped meters need not be at the same site. Referring back to FIG. 1A, that figure illustrates meter data from different user sites 16 that is transmitted to a common information provider 20. If multiple user sites 16 are owned or managed by a common manager, then the data from the commonly owned/managed user sites 16 may be accessed by the common manager. In other words, the manager can, for example, use dynamic meter grouping to compare similar tasks at different sites. Those skilled in the art will recognize the tremendous managerial advantage that dynamic meter grouping can provide to large and small businesses alike.

Because each energy user has some or many unique needs, the electronic energy management system of the present invention provides additional flexibility in report formats. Reports may be viewed in table or graph format (e.g., bar graph, line graph, pie chart or similar). The reports may be exported to a file for use with other computer programs and integrated into other documents. Further, using a web-based server allows users to use an intuitive "point and click" navigation scheme. This reduces the costs and complexities of training new users.

As discussed above with respect to FIG. 2B, a major advantage of providing information via the Internet and World Wide Web is that the vast majority of the software involved resides with the web server computer 26 (see FIG. 1). Users only need one of a variety of widely available and inexpensive web browsers. Software updates can be provided without users having to purchase and wait for software updates, manuals, and so on. In other words, software updates can be provided on the server computer 26 alone.

As various changes could be made in the above constructions and methods without departing from the scope of the invention, it is intended that all matter contained in the above description and shown in the accompanying drawings shall be interpreted as illustrative only, and not in a limiting sense.

What is claimed is:

1. An electronic energy management system for use with an energy distribution network for providing energy from an energy resource to user sites, and a plurality of energy usage meters, at least one at each user site, for monitoring energy usage at each user site, said system comprising:

a data acquisition subsystem for acquiring energy usage data from the energy usage meters wherein the energy usage data comprises multiple increments of total energy usage over each of a plurality of defined periods of time;

an electronic data storage at a central location remote from the energy usage meters for storing the acquired energy usage data; and an electronic communication subsystem for providing user access to the stored acquired energy usage data from the electronic data storage.

2. The electronic energy management system of claim 1 wherein the energy resource comprises at least one of electricity, natural gas, compressed air, or industrial fluids.

3. The electronic energy management system of claim 1 wherein the data acquisition subsystem acquires the energy usage data at preset times and summarizes the acquired data for intervals between the preset times.

4. The electronic energy management system of claim 1 wherein the electronic communication subsystem further comprises an application server at the central location remote from the energy usage meters, said application server being adapted to retrieve the stored acquired energy usage data from the electronic data storage, and a remote computer for accessing the acquired energy usage data from the application server, said application server and said remote computer having a connection to a multipurpose, multiuser communication network.

5. The electronic energy management system of claim 4 wherein a user's access to certain data from the application server is restricted.

6. The electronic energy management system of claim 4 wherein the multipurpose, multiuser communication network comprises the internet.

7. The electronic energy management system of claim 1 wherein the electronic communication subsystem further comprises an application server at the central location remote from the energy usage meters, said application server being adapted to retrieve the stored acquired energy usage data from the electronic data storage, and a remote computer for accessing the acquired energy usage data from the application server, said remote computer having a connection to the application server via a limited purpose communication network.

8. The electronic energy management system of claim 7 wherein a user's access to certain data from the application server is restricted.

9. The electronic energy management system of claim 1 further comprising a report generator for generating reports representative of the energy usage data associated with at least one of the plurality of energy usage meters, said report generator being accessible by a user.

10. The electronic energy management system of claim 9 wherein the generated reports display the energy usage data in terms of cost.

11. The electronic energy management system of claim 9 wherein the generated reports display the energy usage data in terms of units of energy.

12. The electronic energy management system of claim 9 wherein the generated report further comprises a first display format and a second display format, the second display format displaying the energy usage data to a finer degree of resolution than the first display format.

13. The electronic energy management system of claim 9, the report generator further grouping the energy usage data from two or more of the plurality of energy usage meters whereby the generated reports reflect the energy usage data associated with the two or more of the plurality of energy usage meters.

14. The electronic energy management system of claim 1 further comprising a communication interface associated with the energy usage meters, said communication interface for transmitting an energy usage signal to a central station, said energy usage signal being representative of the energy usage data, whereby the data acquisition subsystem acquires the energy usage data from the energy usage meters.

15. The electronic energy management system of claim 14 wherein the communication interface further comprises a wireless communication circuit for transmitting the energy usage signal to the central station.

16. The electronic energy management system of claim 14 wherein the communication interface further comprises a telecommunications signal network for transmitting the energy usage signal to the central station.

17. The electronic energy management system of claim 14 wherein the communication interface further comprises a modulation circuit for imposing a carrier signal onto the energy distribution network, said carrier signal for transmitting the energy usage signal to the central station.

18. The electronic energy management system of claim 1 wherein the data acquisition subsystem acquires the energy usage data from a selected number of the plurality of energy usage meters, the selected number being associated with a single user and wherein the selected number of the plurality of energy usage meters each measures usage of a same type of energy resource; whereby integrated energy usage data may be retrieved from the electronic data storage.

19. The electronic energy management system of claim 18 wherein at least one of the plurality of energy usage meters further comprises a watt-hour meter, said watt-hour meter having an integration circuit for providing a watt-hour signal representative of the time integral of the active or reactive power flowing through the integration circuit.

20. The electronic energy management system of claim 19 further comprising a communication interface associated with the watt-hour meter, said communication interface for transmitting the watt-hour signal to a central station, whereby the data acquisition subsystem acquires the watt-hour signal from the watt-hour meter.

21. The electronic energy management system of claim 18 wherein at least one of the plurality of energy usage meters further comprises a fluid meter, said fluid meter having an integration circuit for providing a liquid flow signal representative of the time integral of the active liquid flow flowing through the integration circuit.

22. The electronic energy management system of claim 21 further comprising a communication interface associated with the fluid meter, said communication interface for transmitting the liquid flow signal to a central station, whereby the data acquisition subsystem acquires the liquid flow signal from the fluid meter.

23. A water management system for use with a water distribution network for providing water from a water resource to user sites, and a plurality of water usage meters, at least one at each site, for monitoring water usage at each user site, said system comprising:
  a data acquisition subsystem for acquiring water usage data from the water usage meters wherein the water usage data comprises multiple increments of total water usage over each of a plurality of defined periods of time;
  an electronic data storage at a central location remote from the water usage meters for storing the acquired water usage data; and
  an electronic communication subsystem for providing user access to the stored acquired water usage data from the electronic data storage,
  wherein the data acquisition subsystem acquires water usage data from a selected number of the plurality of water usage meters, the selected number being associated with a single user whereby integrated water usage data may be retrieved from the electronic data storage.

24. The water management system of claim 23 wherein at least one of the plurality of water meters has an integration circuit for providing a liquid flow signal representative of the time integral of the active liquid flow flowing through the integration circuit.

25. An electronic energy management system for use with an energy distribution network for providing energy from an energy resource to user sites comprising:

a plurality of energy usage meters, at least one at each site, for monitoring energy usage at each user site;

a data acquisition subsystem for acquiring energy usage data from the energy usage meters wherein the energy usage data comprises multiple increments of total energy usage over each of a plurality of defined periods of time;

an electronic data storage at a central location remote from the energy usage meters for storing the acquired energy usage data; and an electronic communication subsystem for providing user access to the stored acquired energy usage data from the electronic data storage.

26. An electronic energy management system for use with an energy distribution network for providing energy from an energy resource to user sites, and a plurality of energy usage meters, at least one at each user site, for monitoring energy usage at each user site, said system comprising:

a data acquisition subsystem for acquiring energy usage data from the energy usage meters;

an electronic data storage at a central location remote from the energy usage meters for storing the acquired energy usage data;

an electronic communication subsystem for providing user access to the stored acquired energy usage data from the electronic data storage; and a report generator for generating reports representative of the energy usage data associated with at least one of the plurality of energy usage meters, said report generator being accessible by a user.

27. The electronic energy management system of claim 26 wherein the generated reports display the energy usage data in terms of cost.

28. The electronic energy management system of claim 26 wherein the generated reports display the energy usage data in terms of units of energy.

29. The electronic energy management system of claim 26 wherein the generated report further comprises a first display format and a second display format, the second display format displaying the energy usage data to a finer degree of resolution than the first display format.

30. The electronic energy management system of claim 26 wherein the report generator further groups the energy usage data from two or more of the plurality of energy usage meters whereby the generated reports reflect the energy usage data associated with the two or more of the plurality of energy usage meters.

* * * * *

UNITED STATES PATENT AND TRADEMARK OFFICE
CERTIFICATE OF CORRECTION

PATENT NO.    : 6,327,541 B1
DATED         : December 4, 2001
INVENTOR(S)   : Michael E. Pitchford et al.

It is certified that error appears in the above-identified patent and that said Letters Patent is hereby corrected as shown below:

<u>Title page, Item [54] and Column 1, lines 1 and 2,</u>
The Title incorrectly reads "ELECTRONIC ENERGY MANAGEMENT SYSTEM" which should read -- DATA ACQUISITION AND ACCESS SYSTEM FOR RESOURCE MANAGEMENT --.

Signed and Sealed this

Tenth Day of September, 2002

Attest:

JAMES E. ROGAN
Attesting Officer        Director of the United States Patent and Trademark Office